United States Patent [19]
Grossmann

[11] 3,957,780
[45] May 18, 1976

[54] SUBSTITUTED UREIDO-S-TRIAZINES
[75] Inventor: Hans-Hermann Grossmann, Oberems, Taunus, Germany
[73] Assignee: Hoechst Aktiengesellschaft, Frankfurt am Main, Germany
[22] Filed: Oct. 4, 1974
[21] Appl. No.: 512,022

[30] Foreign Application Priority Data
Oct. 8, 1973   Germany............................ 2350414

[52] U.S. Cl............................ 260/249.5; 260/249.9; 260/45.8 NT; 252/401
[51] Int. Cl.² ................ C07D 251/40; C07D 251/48
[58] Field of Search ....................... 260/249.5, 249.9

[56] References Cited
UNITED STATES PATENTS
3,849,413   11/1974   Begrich et al.................... 260/249.5

Primary Examiner—John M. Ford
Attorney, Agent, or Firm—Curtis, Morris & Safford

[57] ABSTRACT

Hydroxyphenyl-ureido-s-triazines are prepared by reacting 4H-1,3-benzoxazin-4-ones with guanyl urea. The triazine derivatives are useful as UV stabilizers for plastic materials.

7 Claims, 1 Drawing Figure

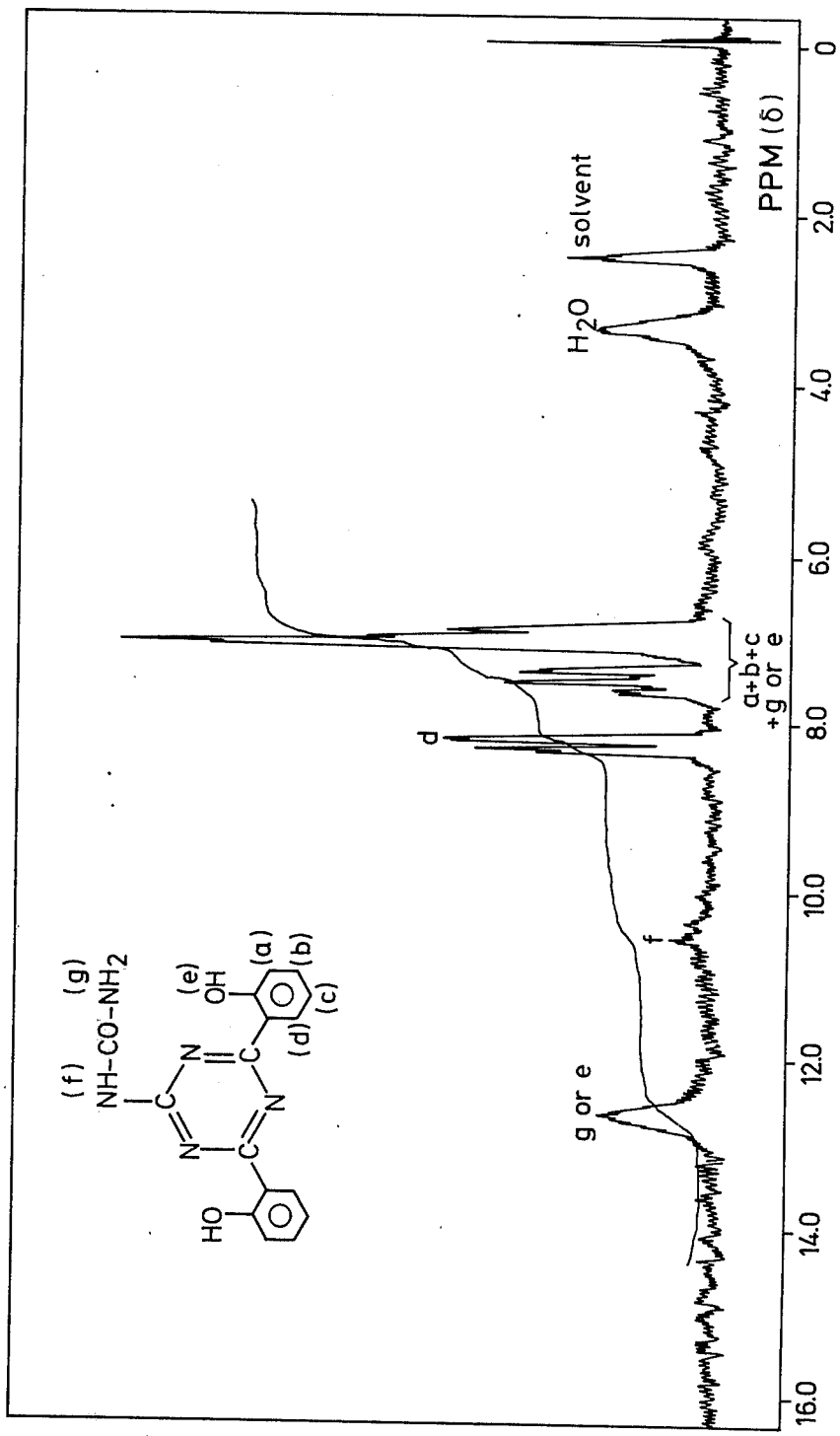

SUBSTITUTED UREIDO-S-TRIAZINES

The present invention relates to substituted ureido-s-triazines.

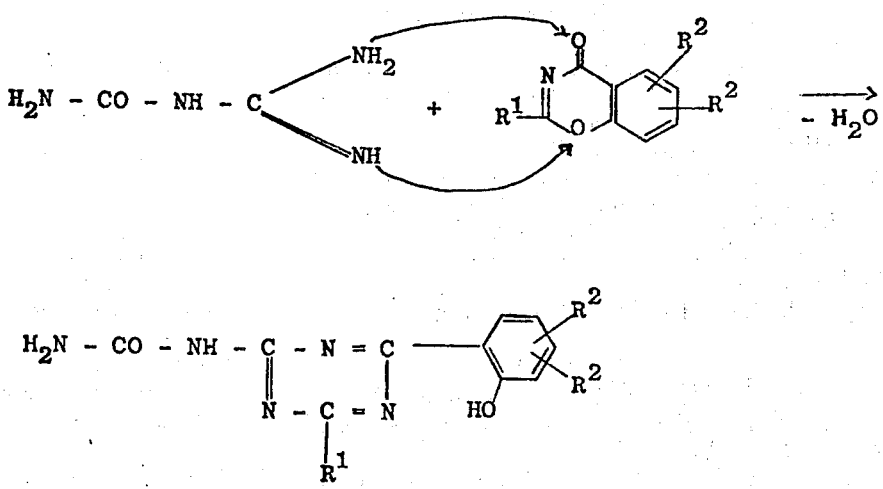

It is known to prepare substituted s-triazines by reaction of benzoxazin-4-ones with amidines (Helv. Chim. Acta, Vol. 55, Fasc. 1 (1972), No. 153, p. 1566). These compounds are suitable as UV stabilizers for plastic materials (German Pat. No. 1 241 452).

It is furthermore known that certain 3,5-dialkyl-4-hydroxy-phenyl-triazine derivatives are suitable as stabilizers for organic materials prone to thermal and oxidative decomposition (German Offenlegungsschrift No. 2 219 012).

The present invention provides a hydroxyphenyl-ureido-s-triazine of the formula

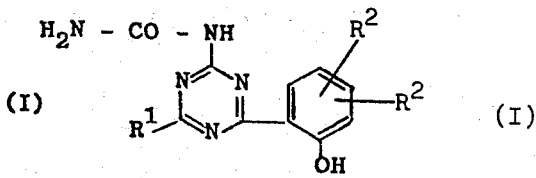

wherein $R^1$ represents a hydrogen atom, an alkyl or alkoxy radical each having from 1 to 6, preferably 1,2,3, or 4 carbon atoms; a phenyl or phenoxy radical each of which may be substituted by a hydroxy, nitro or amino group which may carry one or two alkyl radicals each having from 1 to 6, preferably 1,2,3, or 4 carbon atoms; or an amino group which may carry one or two alkyl radicals each having from 1 to 6, preferably 1,2,3, or 4 carbon atoms; and $R^2$ represents a hydrogen atom, hydroxy group, an alkyl or alkoxy radical each having from 1 to 6, preferably 1,2,3, or 4 carbon atoms, or a phenyl radical.

The present invention provides furthermore a process for the preparation of hydroxyphenyl-ureido-s-triazine of formula (I), which comprises reacting a 4H-1,3-benzoxazin-4-one of the formula

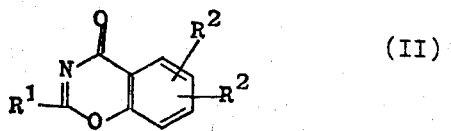

wherein $R^1$ and $R^2$ are as defined above with guanyl urea (dicyano-diamidine).

The synthesis of the hydroxyphenyl-ureido-s-triazine proceeds according to the following reaction scheme:

Examples of the hydroxyphenyl-ureido-s-triazines in accordance with the present invention are the following substances:

4-ureido-2-(2-hydroxyphenyl)-6-methyl-1,3,5-triazine,
4-ureido-2-(2-hydroxyphenyl)-6-tert.butyl-1,3,5-triazine,
4-ureido-2-(2-hydroxyphenyl)-6-phenyl-1,3,5-triazine,
4-ureido-2-(2,4-dihydroxyphenyl)-6-phenyl-1,3,5-triazine,
4-ureido-2-(2-hydroxy-4-methoxy-phenyl)-6-ethyl-1,3,5-triazine,
4-ureido-2-(2-hydroxy-5-methyl-phenyl)-6-phenyl-1,3,5-triazine,
4-ureido-2-(2-hydroxyphenyl)-6-(4-dimethylamino-phenyl)-1,3,5-triazine,
4-ureido-2,6-bis(2-hydroxyphenyl)-1,3,5-triazine,
4-ureido-2-(2,4-dihydroxyphenyl)-6-(2-hydroxy-phenyl)-1,3,5-triazine,
4-ureido-2,6-bis(2,4-dihydroxyphenyl)-1,3,5-triazine,
4-ureido-2-(2-hydroxy-4-methoxy-phenyl)-6-(2-hydroxyphenyl)-1,3,5-triazine,
4-ureido-2-(2-hydroxyphenyl)-6-phenoxy-1,3,5-triazine and
4-ureido-2-(2-hydroxyphenyl)-6-(3-methyl-phenoxy)-1,3,5-triazine.

The NMR spectrum of 4-ureido-2,6-bis(2-hydroxyphenyl)-s-triazine is shown in the accompanying figure of drawing.

The triazine derivatives of the invention are advantageously prepared by reaction of the benzoxazinone with a mineral acid salt of guanyl urea, preferably guanyl urea sulfate or guanyl urea hydrochloride, in the presence of alkali. The alkali is preferably an alkali metal alcoholate, for example sodium or potassium methylate, or sodium or potassium ethylate. The reaction is usually carried out in suspension; suspension agents being especially lower alcohols, for example methanol, ethanol, n-propanol or isopropanol, or lower glycol monoethers, for example methylglycol or ethylglycol. Mixtures of the cited suspension agents may also be used.

The reaction is normally carried out at boiling temperature of the suspension agent, that is, at a temperature of from 50 to 150°C, preferably from 65 to 135°C. Generally, it is not necessary to operate under elevated or reduced pressure, and the reaction is preferably carried out at normal pressure.

The hydroxyphenyl-ureido-s-triazines of the present invention are suitable above all as UV stabilizers for plastic materials. Furthermore, many of the compounds are appropriate as agents for reducing the thermal/acidolytic or thermal/oxidative decomposition of thermoplastic materials, especially oxymethylene polymers. The application as stabilizer is especially advantageous because the compounds have simultaneously a nucleating effect.

The following examples illustrate the invention.

EXAMPLE 1:

A solution of 3.0 g (55 millimoles) of sodium methylate in 100 ml of methanol is added dropwise, while stirring, to a suspension of 12 g (50 millimoles) of 2-(2-hydroxyphenyl)-4H-1,3-benzoxazin-4-one and 7.5 g (25.5 millimoles) of guanyl urea sulfate in 250 ml of methanol, and the mixture is refluxed for 1 hour. After the mixture has been allowed to cool to room temperature, the precipitate formed is suction-filtered, washed once with 1 liter of water and three times with methanol, and dried at 70°C in a vacuum drying oven. The yield is 9.7 g (60.1 % of the theoretical yield). The 4-ureido-2,6-bis(2-hydroxyphenyl)-s-triazine may be recrystallized from methylglycol; a melting point cannot be detected up to 300°C, since the substance sublimates. The structure of the triazine derivative is confirmed by elementary analysis and NMR spectrum.
Elementary analysis:
 calc. C 59.4 %; H 4.0 %; N 21.7 %
 found C 58.6 %; H 4.2 %; N 21.5 %

The NMR spectrum shown in the accompanying figure of drawing was obtained by means of an apparatus having a proton resonance frequency of 60 MHz under the following conditions:

| solvent | $(CD_3)_2SO$ |
| --- | --- |
| temperature | 36 – 40°C |
| filter | 0.4 Hz |
| irradiated energy | 0.06 mG |
| sweep time | 500 seconds |
| sweep width | 1000 Hz |
| spectrum amplitude | 50 |
| integral amplitude | 80 |
| internal standard | tetramethyl-silane |

EXAMPLE 2:

A solution of 25.3 g (1.1 moles) of sodium in 500 ml of methanol is added dropwise, while stirring, to a suspension of 239.2 g (1 mole) of 2-(2-hydroxyphenyl)-4H-1,3-benzoxazin-4-one and 166.1 g (0.55 mole) of guanyl urea sulfate in 2.5 liters of methanol. The mixture is then refluxed for 30 minutes. After cooling of the mixture to room temperature, the precipitate formed is suction-filtered, washed with water and methanol and dryed at 70°C in a vacuum drying oven. The yield is 225.2 g (69.7 % of the theoretical yield). The 4-ureido-2,6-bis(2-hydroxyphenyl)-s-triazine, after recrystallization from methylglycol, is obtained in the form of thread-like crystals having a light yellow color; a melting point cannot be determined up to 300°C, because the substance sublimates.
Elementary analysis:
 calc. C 59.4 %; H 4.0 %; N 21.5 %
 found C 57.6%; H 4.2%; N 21.5%

EXAMPLE 3:

A solution of 1.27 g (55 millimoles) of sodium in 100 ml of methanol is added dropwise, while stirring, to a suspension of 12.7 g (50 millimoles) of 2-(4-methoxyphenyl)-4H-1,3-benzoxazin-4-one and 9.3 g (27.5 millimoles) of guanyl urea sulfate in 150 ml of methanol. Subsequently, the mixture is refluxed for 30 minutes. After cooling of the mixture to room temperature, the precipitate formed is suction-filtered, washed with water and methanol and dried at 70°C in a vacuum drying oven. The yield is 12.5 g (74.1 % of the theoretical yield). The 4-ureido-2-(2-hydroxyphenyl)-6-(4-methoxyphenyl)-s-triazine, after recrystallization from methylglycol, is obtained in the form of colorless needles; a melting point cannot be determined up to 300°C since the substance sublimates.
Elementary analysis:
 calc. C 60.5 %; H 4.5 %; N 20.8 %
 found C 60.8 %; H 4.7 %; N 20.4 %

EXAMPLE 4:

A solution of 8.9 g (385 millimoles) of sodium in 400 ml of methanol is added dropwise, while stirring, to a suspension of 93.9 g (350 millimoles) of 2-(4-nitrophenyl)-4H-1,3-benzoxazin-4-one and 58.1 g (192.5 millimoles) of guanyl urea sulfate in 1 liter of methanol. Subsequently, the mixture is refluxed for 30 minutes. After cooling of the mixture, the precipitate formed is suction-filtered, washed with water and methanol and dried at 70°C in a vacuum drying oven. The yield is 61.9 g (50.2 % of the theoretical yield). The 4-ureido-2-(2-hydroxyphenyl)-6-(4-nitrophenyl)-s-triazine obtained is a powder having a light yellow color and a melting point of 249°C (decomposition).
Elementary analysis:
 calc. C 54.6 %; H 3.4 %; N 23.8 %
 found C 54.1 %; H 3.4 %; N 23.5 %

EXAMPLE 5: (Example of application)

A linear copolymer made of 98 weight % of trioxan and 2 weight % of ethylene oxide having a density of 1.41 g . ml$^{-1}$, a reduced specific viscosity of 0.73 dl . g$^{-1}$ (measured at 140°C on a solution of the polymer in butyrolactone containing 2 weight % of diphenylamine, in a concentration of 0.5 g/ 100 ml) and a crystallite melting point of 166°C and being present in the form of a powder is mixed with 1 weight %, relative to the poly(oxymethylene) amount, of 2,6-bis-(2-hydroxyphenyl)-4-ureidos-triazine in the form of a powder, and homogenized in a screw extruder at 200°C. The residence time in the cylinder of the extruder is about 4 minutes. The poly(oxymethylene) mass obtained is granulated after having left the extruder.

The size of spherulites of the poly(oxymethylene) is measured using a film prepared from the molding composition obtained. The film having a thickness of 10 microns is prepared by melting the molding composition between two glass plates at 180°C under a pressure of 200 kg . cm$^{-2}$ and subsequent crystallization at 150°C under atmospheric pressure, and it is examined under the microscope. Besides, the molding composition is molded to plates having a dimension of 60 × 60

× 2 mm at a temperature of the mass of 200°C and a temperature of the mold of 80°C. These plates are used to determine the ball indentation hardness according to German Standards VDE 0302(loading time 10 seconds). Furthermore, the loss of weight of the granulated molding composition is determined by exposing the granules for 2 hours in air to a temperature of 230°C. The data obtained are listed in the following Table. For a comparison, the corresponding data of a poly(oxymethylene) without additive are indicated.

| Additive | Size of spherulites (microns) | Ball indentation hardness (kg/cm²) | weight loss (%/2 h) |
| --- | --- | --- | --- |
| — | 550 | 1550 | >50 |
| triazine derivative | 17 | 1610 | 2.3 |

What is claimed is:
1. Hydroxyphenyl-ureido-s-triazine of the formula

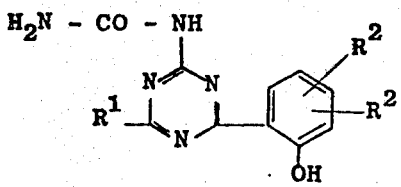

wherein $R^1$ represents a hydrogen atom, an alkyl or alkoxy radical each having from 1 to 6 carbon atoms; a phenyl or phenoxy radical each of which may be substituted by a hydroxy alkyl, alkoxy, nitro or amino group which may carry one or two alkyl radicals each having from 1 to 6 carbon atoms; or an amino group which may carry one or two alkyl radicals each having from 1 to 6 carbon atoms; and $R^2$ represents a hydrogen atom, a hydroxy group, an alkyl or alkoxy radical each having from 1 to 6 carbon atoms, or a phenyl radical.

2. A process for the preparation of hydroxyphenyl-ureido-s-triazine as defined in claim 1 which comprises reacting a 4H-1,3-benzoxazin-4-one of the formula

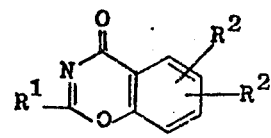

wherein $R^1$ and $R^2$ are as defined in claim 1, with guanyl urea (dicyano-diamidine).

3. The process as defined in claim 2, wherein the reaction is carried out in suspension at a temperature of from 50° to 150°C in the presence of alkali.

4. The compound as defined in claim 1, which is 4-ureido-2,6-bis(2-hydroxyphenyl)-s-triazine.

5. The compound as defined in claim 1, which is 4-ureido-2-(2-hydroxyphenyl)-6-(4-nitrophenyl)-s-triazine.

6. The compound as defined in claim 1, which is 4-ureido-2-(2-hydroxyphenyl)-6-(4-methoxyphenyl)-s-triazine.

7. The compound as defined in claim 1, which is 4-ureido-2-(2-hydroxyphenyl)-6-(3-methyl-phenoxy)-1,3,5-triazine.

* * * * *